United States Patent [19]
Steigerwald

[11] 3,781,505
[45] Dec. 25, 1973

[54] CONSTANT DUTY CYCLE CONTROL OF INDUCTION COOKING INVERTER

[75] Inventor: Robert L. Steigerwald, Schenectady, N.Y.

[73] Assignee: General Electric Company, Schenectady, N.Y.

[22] Filed: June 28, 1972

[21] Appl. No.: 267,143

[52] U.S. Cl.............. 219/10.49, 219/10.77, 321/18
[51] Int. Cl. ............................................. H05b 5/04
[58] Field of Search............... 219/10.49, 10.75, 219/10.77, 10.79, 502, 501; 321/10, 18

[56] References Cited
UNITED STATES PATENTS

| | | | |
|---|---|---|---|
| 3,200,933 | 10/1972 | Haakenniden et al. | 219/501 |
| 3,593,103 | 7/1971 | Chandler et al. | 321/18 |
| 3,710,062 | 1/1973 | Peters | 219/10.49 |
| 3,551,632 | 12/1970 | Geisel | 219/10.77 X |
| 3,320,512 | 5/1967 | Kruger | 321/10 |
| 3,449,629 | 6/1969 | Wigert et al. | 219/502 X |
| 3,670,234 | 6/1972 | Joyce | 321/18 |

Primary Examiner—Bruce A. Reynolds
Attorney—John F. Ahern et al.

[57] ABSTRACT

In a solid state cool-top cooking appliance for inductively heating a utensil, an inverter for driving the induction heating coil utilizes a constant duty cycle control circuit to optimize performance with the utensil coupled with and removed from the energized coil. To compensate for the increased period of oscillation when unloaded, the inverter operating frequency is automatically decreased to reduce voltage and current stresses on circuit components. Conversely, the operating frequency increases when loaded to couple more power to the utensil. An on-off sensor continuously senses an inverter circuit parameter indicative of the load condition, such as a voltage divider and associated switch for sensing the thyristor anode voltage. The sensed information is processed by the control circuit in closed feedback loop manner to vary the thyristor gating signal repetition rate. Disclosed with regard to a one-thyristor series resonant inverter, the technique is applicable to inverters generally.

12 Claims, 10 Drawing Figures 3,781,505

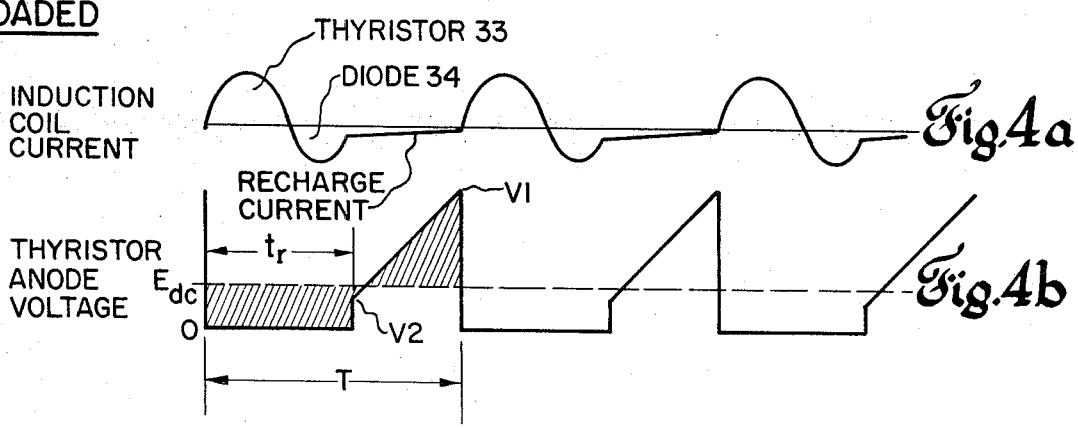
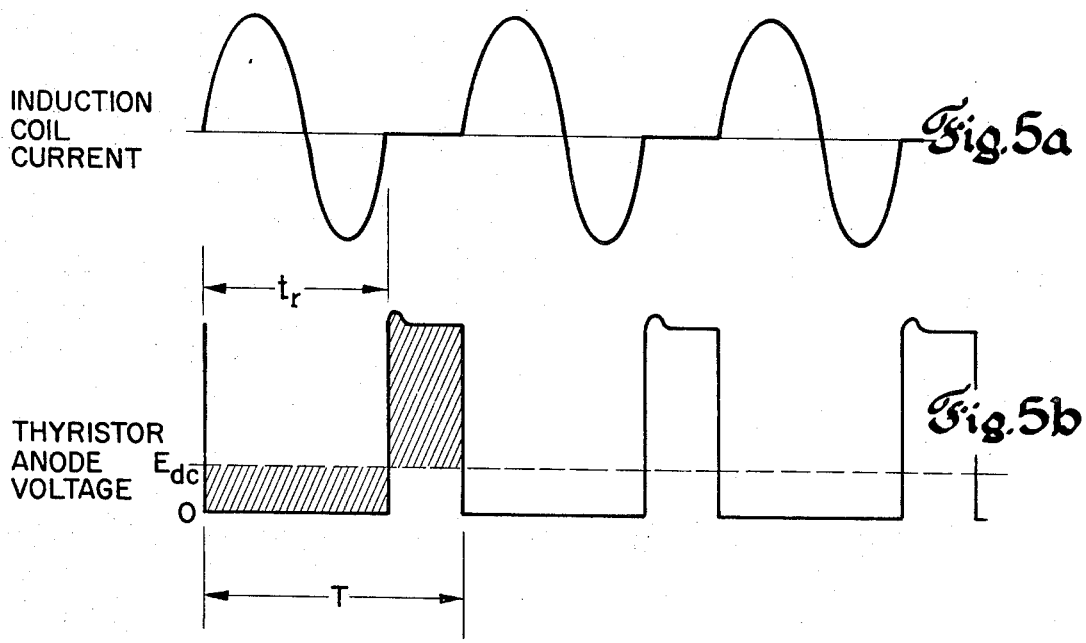
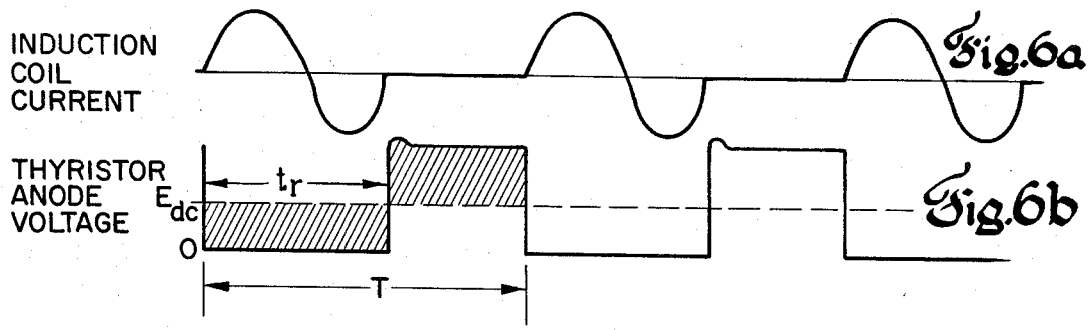

CONSTANT DUTY CYCLE CONTROL OF INDUCTION COOKING INVERTER

BACKGROUND OF THE INVENTION

This invention relates to solid state inverters with a constant duty cycle control circuit, and to induction cooking appliances employing such inverters for improved performance with the utensil on and off the energized coil.

Solid state cooking appliances utilizing the principles of induction heating are commonly referred to as the cool-top range and the counter-top range. To produce the alternating magnetic field that couples power to the cooking utensil, a solid state inverter operated at an ultrasonic frequency is used to drive the induction heating coil. The utensil functions as the inverter load, and removal of the utensil from the energized coil results in a change in the inverter's electrical parameters since it then operates in the no-load condition. A low cost inverter for use in solid state cooking equipment is a one-thyristor series resonant circuit in which the induction heating coil and a commutating capacitor form the basic high frequency oscillator. At a selected operating frequency of the inverter, removal of the utensil from the coil reduces the losses in the resonant circuit. Thus, the components are subjected to greater stresses due to the undamped nature of the resonant circuit at a time when the circuit is in the standby mode. To withstand these greater stresses, the components can be selected with unnecessarily high ratings. Another solution employs a utensil presence detection circuit that senses the thyristor anode voltage by a threshold technique and automatically decreases the inverter operating frequency when an overvoltage is sensed. This is described in copending allowed application Ser. No. 211,926, filed on Dec. 27, 1971 by William P. Kornrumpf and John D. Harnden, Jr., and assigned to the same assignee as the present invention.

Other requirements of cooking equipment to be used by technically unskilled persons such as housewives and chefs are that it be automatic, reliable, and convenient to operate. In particular, it is desirable to have the circuit start up and shut down automatically as well as to adapt to different load conditions. Such features are, of course, advantageous in inverters for other types of induction heating and other technical applications.

SUMMARY OF THE INVENTION

As applied to an improvement in solid state induction cooking appliances, it is recognized that in appropriate inverters the load condition of the induction heating coil, i.e., the magnitude of the utensil load and in particular whether the coil is loaded due to coupling power to the utensil or unloaded by the absence of a utensil, can be detected by sensing a preselected inverter power circuit parameter. In the case of a series resonant inverter, for example, the period of oscillation is shorter with the utensil in cooking position and longer when removed from the energized coil. In general, the heating of a steel utensil produces a shorter period of oscillation than the heating of an aluminum utensil due to higher losses in the series resonant circuit, i.e., due to better coupling between coil and load.

In accordance with the invention, a constant duty cycle control circuit is utilized to supply turn-on or gating signals to the power device or devices controlling the inverter to vary the inverter operating frequency as a function of the load condition of the induction heating coil. The constant duty cycle control circuit is controlled by an on-off sensor, as contrasted to a threshold type sensor, that is connected between selected points on the power circuit and signal level control circuit and continuously senses a preselected power circuit parameter such as the invervals of conduction and nonconduction of the power device or devices or the intervals of oscillation and nonoscillation. In closed feedback loop fashion, the operating frequency automatically increases when the coil is loaded to thereby couple more power to the utensil, and decreases with unloading of the coil by removal of the utensil to thereby reduce the peak voltages and currents for standby operation. The preferred form of an on-off sensor is a resistance voltage divider circuit effectively connected across the terminals of the power device or devices, such as the anode and cathode of a thyristor to sense the thyristor anode voltage, and a solid state switch coupled to a junction of the voltage divider to produce a train of variable width voltage pulses whose widths are in accordance with the on-off times of the power device or devices. The constant duty cycle control circuit further preferably includes an averaging filter circuit for converting the train of pulses to a variable direct voltage signal, and a voltage controlled oscillator and pulse generator for producing gating signals at a variable repetition rate dependent on the magnitude of the direct voltage signal. As additional features, the control circuit may include a minimum and maximum frequency control for limiting the range of the direct voltage signal, and a start-up and shut-down circuit.

The principles of the invention are explained in regard to a one-thyristor series resonant inverter, but are applicable generally to other inverters and other applications.

BRIEF DESCRIPTION OF THE DRAWINGS

FIGS. 4a and 4b are waveform diagrams of the induction coil current and thyristor anode voltage for a loaded inverter with the utensil coupled to the coil;

FIGS. 5a and 5b are waveform diagrams of the induction coil current and thyristor anode voltage for an unloaded inverter with the utensil removed from the energized coil, when the inverter is operated in known manner with the same constant repetition rate gating control as in FIGS. 4a, 4b;

FIGS. 6a and 6b are waveform diagrams of the induction coil current and thyristor anode voltage for an unloaded inverter when operated according to the invention with constant duty cycle gating control.

DESCRIPTION OF THE PREFERRED EMBODIMENT

Figure 1:
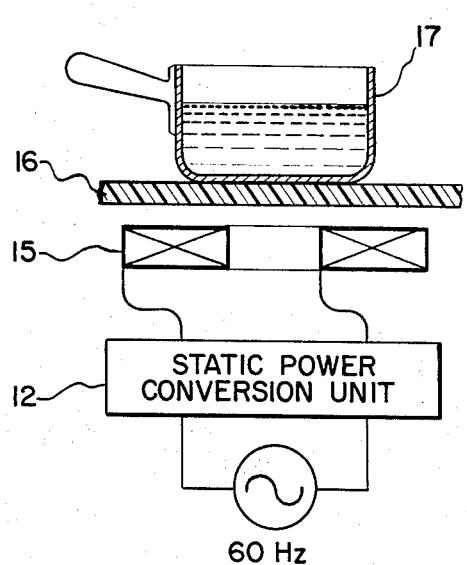
FIG. 1 is a diagrammatic cross-sectional view of an induction surface cooking unit showing a conventional utensil on a cool cooking surface being heated by an induction heating coil.

The basic structural features of a solid state induction cooking appliance are illustrated diagrammatically in FIG. 1. Static power conversion circuit 12 is preferably energized by a single phase commercially available 60 Hz, 120 or 240 volt source of alternating voltage, but in appropriate cases can be energized by a battery. As used with an alternating voltage source, static power converter 12 most commonly comprises a full wave bridge rectifier and a filter network for producing a d-c supply voltage that is converted by a solid state inverter to an ultrasonic frequency voltage wave for driving the induction heating coil 15. Induction heating coil 15 is typically a single layer, annular, air-core or ferromagnetic-core coil made with tightly wound braided ribbon conductors or solid flat strip conductors. In the cooking appliance, induction heating coil 15 is appropriately mounted in a horizontal position immediately below a non-metallic or substantially non-metallic support plate 16, made for example of a thin sheet of glass or plastic. Plate 16 supports the metallic cooking utensil 17 to be heated, and in an electric range or built-in cooktop is referred to as the counter-top cooking surface. Cooking utensil 17 is an ordinary cooking pot or pan, a frying pan, or some other available metallic utensil used in food preparation, made either of magnetic or non-magnetic materials. Operation of static power converter 12 to impress an ultrasonic frequency voltage wave on induction heating coil 15 results in the generation of an alternating magnetic field which is coupled across the air gap and utensil support plate 16 to utensil 17. At an ultrasonic operating frequency in the range of 18–40 kHz, the cooking appliance is inaudible to most people.

Among the advantages of induction cooking are, briefly, that the continuous and unbroken cooking surface 16 remains relatively cool to the human touch; spilled foods do not burn and char, and hence, both surface 16 and utensil 17 are easy to clean; and the unobstructed cooking surface is immediately available for other food preparation and cooking tasks. The utensil is heated more uniformly than is the case with a conventional gas range or electric resistance heating range, and transfer of energy to utensil 17 is relatively efficient and consistent whether the range and utensil are new or old. Other desirable user features are the fast utensil warm-up and rapid response to changes in the heating level; noiseless operation; and complete freedom to move the utensil on the cooking surface since at ultrasonic frequencies there are insignificant reaction forces of either attraction or replusion acting on the utensil. An induction surface cooking unit for use with conventional pots and pans and other cooking utensils such as utensil 17 in FIG. 1 is described more fully in allowed application Ser. No. 200,530, filed on Nov. 19, 1971, by William P. Kornrumpf, now U.S. Pat. No. 3,697,716, dated Oct. 10, 1972, and assigned to the same assignee as the present invention. In the domestic induction range or cooktop there disclosed, induction heating coil 15 is a simple flat spiral coil. Further, a useful power range for general cooking is from 1 to 1.5 kilowatts to a lower limit of 100 watts or less in order to perform the common cooking requirements ranging from rapid heating to warming.

Figure 2:
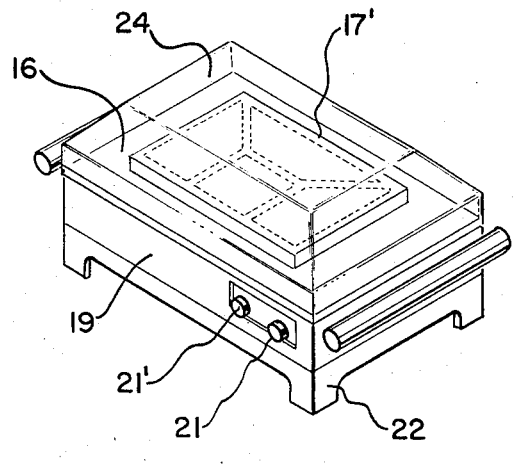
FIG. 2 is a perspective view of a portable induction warming appliance suitable for defrosting frozen foods in aluminum foil containers and for disposable foil cooking.

The portable single-coil induction cooking unit shown in FIG. 2 is especially suitable for the defrosting and warming of frozen convenience foods packaged in thin aluminum foil containers. The unit is also used for the warming and cooking of foods in a user-made disposable aluminum foil utensil, as well as foods placed on a sheet of aluminum foil or foil that is wrapped about the food to achieve an oven effect. A particular advantage of disposable foil cooking is that it obviates the clean-up and storage problems of pots and pans. The aluminum foil induction cooker of FIG. 2 is intended to stand on a kitchen counter surface and is energized by a 120 volt source. A relatively small box-like housing 19 contains the electronic circuitry and induction heating coil 15, and the unit is controlled by an on-off knob 21 and, if provided, a power level knob 21′. A combination leg and handle unit 22 is attached to housing 19 to facilitate easy handling and storage. Faster and more efficient cooking and warming results are produced by enclosing the cooking surface 16 with a removable cover 24, which conveniently is made of a suitable transparent plastic. To obtain even heating of aluminum foil containers and disposable utensils with a rectangular or a square shape, such as the frozen "TV dinner" 17′, induction heating coil 15 preferably has several series-connected elongated coil sections in a rectangular configuration. An evenheating induction coil for producing a uniform heating distribution in aluminum foil with an optimum thickness of 0.5 mils is comprised by three elongated simple coil sections arranged side-by-side and surrounded by a peripheral coil section. For further information on metallic foil induction cooking, including a description of this coil, the reader is referred to copending allowed application Ser. No. 245,570, filed Apr. 19, 1972, by John D. Harnden, Jr. and William P. Kornrumpf, and assigned to the same assignee as this invention. An induction surface cooking unit solely for aluminum foil cooking and warming can have a maximum power in the range of 200–400 watts, and an adjustable heating level or temperature may not be required.

Figure 3:
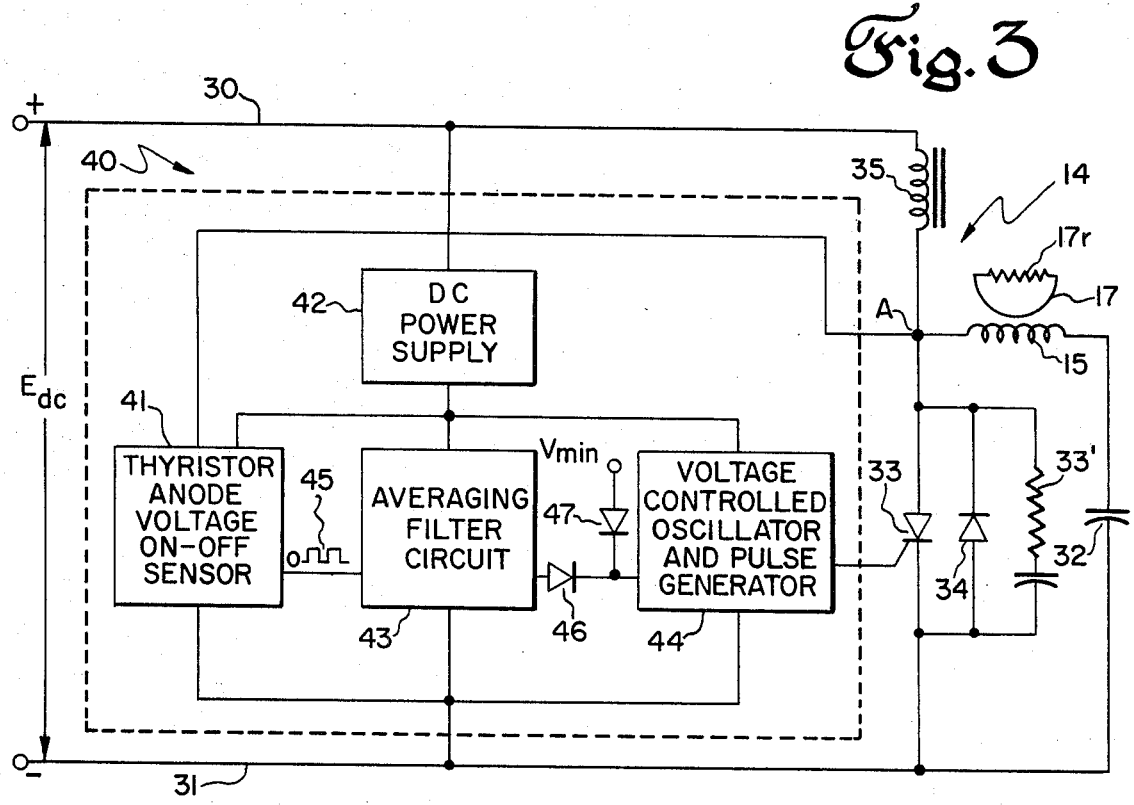
FIG. 3 is a schematic circuit diagram of the inverter power circuit showing in block diagram form the major conpoments of the constant duty cycle control circuit.

Applied to a solid state induction cooking appliance, the inverter power circuit constructed according to the teaching of the invention with a constant duty cycle control circuit as illustrated in simplified block diagram form in FIG. 3 is useful to achieve improved operation and greater load tolerance with the utensil coupled to and removed from the energized coil. The effect of constant duty cycle control operation is to automatically reduce the output power available at the induction heating coil when the circuit is in the standby mode. The preferred embodiment utilizes a one-thyristor series resonant inverter, however it will be understood that the invention is applicable in appropriate cases to other inverter configurations using other types of power semiconductors such as transistors and other thyristors. The preferred embodiment is further described with regard to a portable aluminum foil warming appliance, but the principles apply generally to induction surface cooking units with higher power ranges for domestic ranges and cooktops and for commercial cooking equipment. The inductively heated utensil can be a conventional cooking pot or pan, or a stamped reusable thin metal multi-cavity cooker, as well as the previously described frozen convenience food aluminum foil container, a user-fashioned disposable foil utensil, a sheet of foil or a foil wrapping, and so on, all of which are hereafter referred to as the utensil 17.

In order to understand the constant duty cycle control circuit, it is necessary to first discuss briefly the structure and operation of the inverter power circuit in FIG. 3, which shows a preferred form of inverter 14 for use in ultrasonic frequency induction cooking appliances. Reference may be made to the now U.S. Pat. No. 3,697,716, for a more complete description of inverter 14. This one-thyristor series resonant inverter requires a small number of power components, only one gating or control circuit, and the output power is easily controlled. The d-c power supply, not here illustrated, is a full wave diode bridge rectifier and a simple filter network for supplying a constant d-c input voltage $E_{dc}$ at inverter input terminals 30 and 31. Inverter 14 comprises a unidirectional conducting power thyristor 33 connected in series circuit relationship with a reset inductor 35 between d-c input terminals 30 and 31. A diode 34 to conduct power current in the reverse direction is connected across the load terminals of thyristor 33. A series snubber RC circuit 33' is also usually connected across the load terminals of thyristor 33 to limit the rate of reapplication of forward voltage to the device which otherwise could falsely trigger thyristor 33 into the conducting state. The basic power circuit is completed by a computating capacitor 32 and induction heating coil 15 connected in series with one another and coupled directly across the terminals of the inverse-parallel combination of thyristor 33 and diode 34. When either of the power devices is conducting, capacitor 32 and induction heating coil 15 form a series resonant circuit for generating damped sinusoidal current pulses that flow through induction heating coil 15, which has the dual function of providing commutating inductance as well as coupling power to the load. Reset inductor 35 functions to reset commutating capacitor 32 by charging the commutating capacitor positively during the non-conducting intervals of the thyristor-diode combination. Each cycle of current flow is initiated by a gating pulse applied to thyristor 33 by the constant duty cycle control circuit 40.

The application of a gating pulse to thyristor 33 by constant duty cycle control circuit 40 causes it to turn on, energizing the high frequency series resonant circuit essentially comprising commutating capacitor 32 and induction heating coil 15. A damped sinusoidal current pulse flows through induction heating coil 15 and charges commutating capacitor 32 negatively. The amount of damping depends upon the degree of loading of induction heating coil 15. At this point the current in the series resonant circuit reverses and a damped sinusoidal current pulse of the opposite polarity flows through induction heating coil 15 and diode 34. During the time that feedback diode 34 is conducting, thyristor 33 is reverse biased by the voltage across diode 34 and turns off. When the current in the series resonant circuit again attempts to reverse, thyristor 33 does not conduct since it has regained its forward voltage blocking capabilities, and a gating pulse is not applied to the thyristor at this time. Because of the losses in the electrical circuit due mostly to the heating of the utensil, commutating capacitor 32 at the end of the complete conduction cycle on a steady state basis is left charged to a lower voltage than it had at the beginning of the oscillation. During the circuit off-time when both of the power devices 33 and 34 are non-conducting, the additional energy stored in reset inductor 35 is discharged and transferred primarily to commutating capacitor 32, thereby recharging the commutating capacitor 32 to its original voltage level on a steady state basis and thus restoring the commutating capacitor energy which was lost during the oscillation period. During the energy transfer period some energy is also drawn from the d-c supply through reset inductor 35 to aid in the recharging of commutating capacitor 32.

FIG. 4a shows the asymmetrical sinusoidal induction coil current for several complete cycles of operation for the loaded condition of the inverter, with utensil 17 coupled to the coil and being heated by induction. The components of coil current produced during the high frequency oscillation when conducting through thyristor 33 and diode 34 are labeled. The time delay interval between successive sinusoidal pulses corresponds to the energy transfer period when there is a small current circulating in coil 15 due to the recharge current of capacitor 32. With preactical component choices, the circuit transfers more energy from reset inductor 35 and the d-c source to commutating capacitor 32 as the energy transfer period $T-t_r$ is made shorter relative to the high frequency oscillation period $t_r$. FIG. 4b shows the thyristor anode voltage at point A (FIG. 3) with respect to the negative of the d-c supply, on the inverter power circuit. The operating frequency or repetition rate of the inverter determines the period T of each complete cycle of operation. During the oscillatory interval $t_r$ when thyristor 33 or diode 34 is conducting, point A, neglecting the diode or thyristor voltage drops, is at the potential of negative d-c input terminal 31. Consequently, current is built up in reset inductor 35. During the non-oscillatory interval $T-t_r$ corresponding to the energy transfer period, the potential at point A, referred to the negative d-c terminal, is substantially the same as the commutating capacitor voltage and rises approximately linearly as capacitor 32 is recharged by reset inductor 35 and the d-c source. The voltages V1 and V2 are essentially the initial and final voltages on capacitor 32, and are a measure of the energy lost during the oscillation, which is a function of coil loading. The average voltage appearing at the thyristor anode is equal to the d-c supply voltage $E_{dc}$ since, in the steady state, no d-c voltage can appear across reset inductor 35. Thus, in a complete cycle of operation, the shaded area below the dashed line representing $E_{dc}$ is equal to the shaded area above the dashed line. When the operating frequency of thee inverter is increased, reducing the period T, more energy is transferred from reset inductor 35 to commutating capacitor 32 during the shortened energy transfer period, with the result that the initial capacitor voltage V1 is higher. There are accordingly two effects that increase the power in watts supplied to the utensil when the inverter operating frequency is increased. There are larger as well as more frequently applied current pulses in induction heating coil 15.

The load for inverter 14 is provided by the electrical losses in the utensil. With respect to the utensil load, induction heating coil 15 functions as the primary winding of an air-core transformer. In a physical equivalent circuit for the utensil, identified generally at 17, the utensil functions as a single turn secondary winding with a series resistance 17r connected between the ends of the single turn representing the $I^2R$ or eddy current losses, and hysteresis losses where applicable. The currents and voltages induced in the utensil are determined essentially by the transformer laws. When there is no utensil coupled with the energized coil, the unloaded inverter has reduced losses with a resultant increase in the higher frequency oscillation period $t_r$. That is, in the loaded condition the inverter power circuit can be described as a damped oscillatory L-C-R circuit, whereas in the unloaded condition, it is essentially an undamped oscillatory L-C circuit with relatively little loss in the high frequency resonant circuit. Reference may be made to the previously identified copending application Ser. No. 211,926 for a further discussion of this and other common subject matter.

FIGS. 5a and 5b show the induction coil current and thyristor anode voltage for an unloaded inverter with the same operating frequency as in FIGS. 4a and 4b. Thus, gating pulses are supplied to thyristor 33 in known manner at a constant repetition rate for both the loaded and unloaded conditions. The period T is the same, but the high frequency oscillation period $t_r$ increases due primarily to the removal of the utensil resistive losses. During the oscillatory interval, commutating capacitor 32 charges positively almost as far as it does negatively. In effect, point A is at the potential of the negative d-c terminal for a longer period than the loaded case and thus a larger average positive voltage is applied to reset inductor 35. Since the average value of voltage across an ideal inductor must be zero in the steady state, capacitor 32 is charged to a much higher voltage. Also, the non-oscillatory interval $T-t_r$ decreases when the coil is unloaded and results in larger current pulses since the initial capacitor voltage is at a much higher level. Summarizing, for a constant operating frequency situation, the unloaded inverter has a high peak thyristor anode voltage and produces higher peak currents as compared to the loaded inverter. This is obviously an undesirable situation since the current stresses, voltage stresses, and circuit losses are highest at a time when the circuit is in a standby mode.

By using the constant duty cycle control circuit 40 shown in FIG. 3, the operating frequency of the inverter is automatically decreased when the induction heating coil is unloaded to hold the duty cycle $t_r/T$ approximately constant. The repetition rate of supplying gating pulses to thyristor 33 is now variable and is in effect a function of the high frequency oscillation period $t_r$. The reduced induction coil current and thyristor anode voltage obtained for the unloaded inverter with constant duty cycle gating as opposed to constant frequency gating are illustrated in FIGS. 6a and 6b. Comparing the shaded portions of the thyristor anode voltage below and above the supply voltage $E_{dc}$ in FIGS. 5b and 6b, it is seen that the voltage during the high frequency oscillation period $t_r$ is the same, but is considerably reduced in the constant duty cycle case due to the much greater length of the non-oscillatory interval $T-t_r$. Since the initial voltage V1 on commutating capacitor 32 is considerably reduced in the constant duty cycle case, the peak amplitude of the induction coil current is also considerably less. With a constant duty cycle control circuit, the peak voltages and peak currents for the unloaded inverter have approximately the same values as for the loaded inverter, and depending upon the particular inverter and utensil can be considerably less. Optimum operation is achieved by automatically decreasing the operating frequency when the induction heating coil is unloaded, which results in considerably lower circulating currents, thyristor voltages, and standby losses. Conversely, the operating frequency increases automatically when the coil is loaded resulting in more power being coupled into the utensil. Using this technique, lower voltage and lower current rated thyristors and other circuit components may be used for a given application. For utensils made of a metal, such as stainless steel, with superior coupling characteristics as compared to aluminum foil, the effect of using the constant duty cycle control circuit is even more pronounced due to the greater difference between the high frequency oscillation period $t_r$ in the loaded and unloaded cases.

Referring to FIG. 3, constant duty cycle control circuit 40 is connected between d-c input terminals 30 and 31, has an output connection to the gate of thyristor 33, and as a novel feature has a sensor input connection to an appropriate point on the inverter power circuit such as point A to sense a power circuit parameter indicative of the intervals of conduction and nonconduction of the solid state power devices, or indicative of the oscillating and non-oscillating intervals of the power circuit. The thyristor anode voltage, or more generally the anode-cathode voltage, is such a power circuit parameter. The major components of the preferred form of constant duty cycle control circuit 40 to be described are illustrated in simplified block diagram form. Although not essential to the practice of the invention, it is desirable that a substantial portion of the control circuit, if not the complete circuit, be fabricated as a monolithic or hybrid integrated circuit. The thyristor anode voltage sensor 41 is more particularly an on-off sensor that operates continuously during each complete cycle of the inverter power circuit. The control circuit is energized for signal level operation by a low voltage d-c power supply 42 which normally derives its power by connection between terminals 30 and 31. The remainder of the control circuit includes essentially an averaging filter circuit 43 and a voltage controlled oscillator and pulse generator circuit 44. Preferably, thyristor anode voltage sensor 41 is provided by a simple voltage divider connected between point A on the power circuit and the negative d-c terminal that controls a switching device such as a transistor. Accordingly, the voltage divider is provided with an energizing voltage when thyristor 33 and diode 34 are in the nonconducting state, so that the thyristor is turned on, and has no energizing voltage when either power device is in the conducting state, so that the transistor is turned off. The output of the continuously operating on-off sensor 41 in the form of a train of variable width voltage pulses 45 is fed to the averaging filter circuit 43. The output of averaging filter circuit 43 is a variable direct voltage signal indicative of the conducting and nonconducting intervals of thyristor 33 and diode 34, or of the oscillating and non-oscillating condition of the power circuit. This d-c level effectively controls the repetition rate of the gating signals generated by voltage controlled oscillator and pulse generator 44. These gating signals are also known as turn-on signals or firing signals. A closed feedback loop control is established such that the repetition rate of the gating signals, and therefore the operating frequency of the inverter, increases when the conducting intervals of the solid state power devices decrease, or the oscillating intervals of the power circuit decrease, and vice versa. This operation achieves an approximately constant duty cycle control.

A minimum frequency control to prevent operation of the inverter in the audible range below about 18 kHz and also to aid the circuit to start properly is provided in schematic form by diodes 46 and 47 and a $V_{min}$ reference voltage source. The variable d-c output of averaging filter circuit 43 is normally conducted through diode 46 to the input of voltage controlled oscillator 44. Diode 47 connected between the reference voltage source and the input of voltage controlled oscillator 44 is ordinarily reverse biased. Diode 47 conducts, however, to provide a predetermined minimum voltage input to voltage controlled oscillator 44 whenever the d-c output of averaging filter circuit 43 falls below the predetermined level, at which time diode 46 becomes reverse biased. This minimum frequency control is operative during the circuit start-up and to ensure noiseless operation at all times. Although not here illustrated, a maximum frequency control to prevent the operating frequency from rising above a selected upper limit of 40 kHz or less is also desirable. Another feature of control circuit 40 normally required is provision for controlled circuit shut-down.

Figure 7:
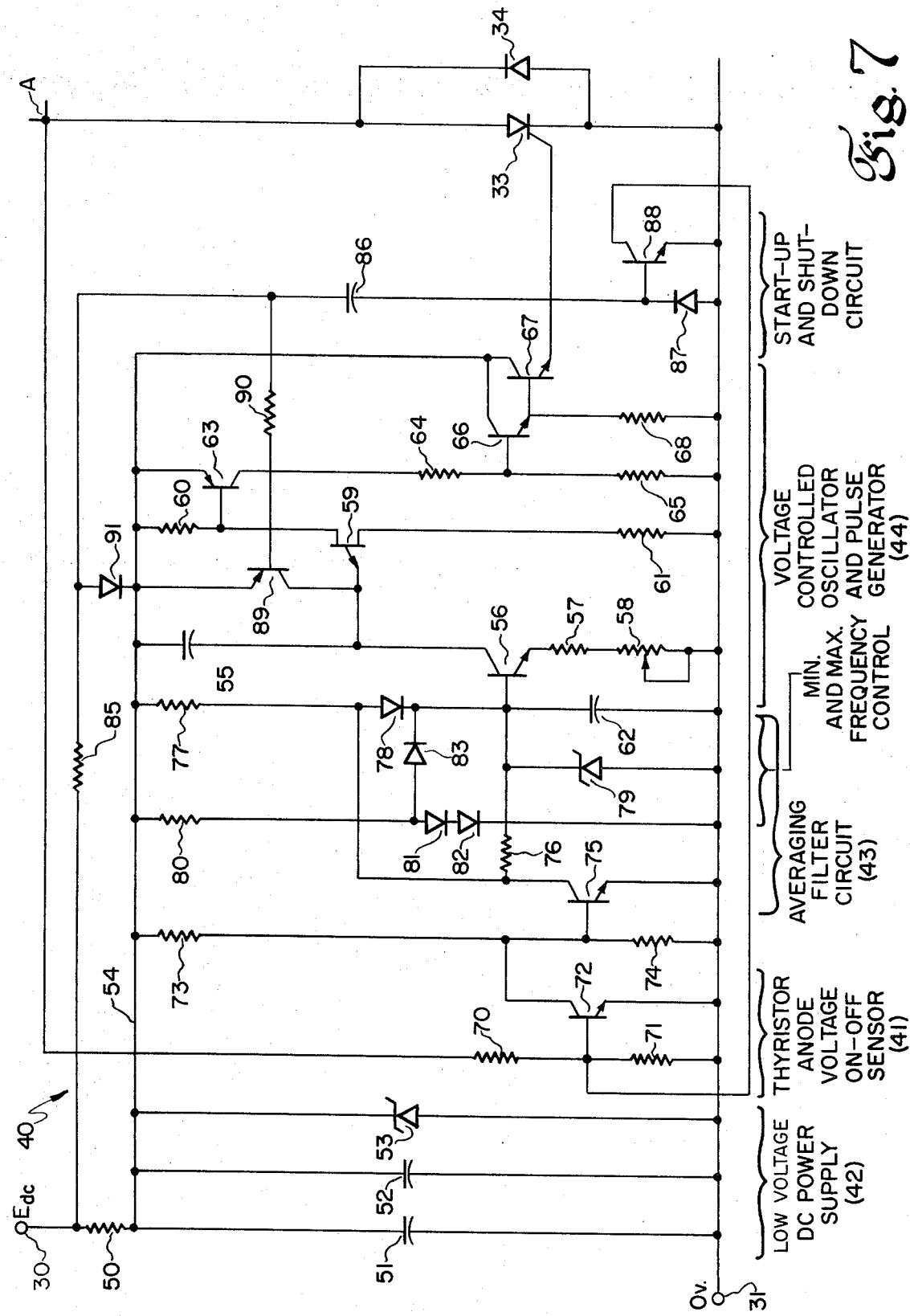
FIG. 7 is a detailed circuit diagram of the constant duty cycle control circuit illustrated in simplifier form in FIG. 3.

FIG. 7 shows the detailed circuit diagram of the preferred embodiment of constant duty cycle control circuit 40. Low voltage d-c power supply 42 is connected between the power circuit d-c input terminals 30 and 31 and includes one or more voltage dropping resistors 50 connected in series with the parallel combination of a first filter capacitor 51, a second filter capacitor 52, and a Zener diode 53. The power circuit input voltage $E_{dc}$ is typically 150 volts, while the Zener regulated voltage supplied between low voltage input terminals 54 and 31 is typically 12–15 volts. Filter capacitor 51 is an energy storage electrolytic capacitor while filter capacitor 52 is a high frequency capacitor to provide a low source of impedance so that there is sufficient energy storage to generate a gating pulse of the required magnitude and rise time. The basic functional components of voltage controlled oscillator and pulse generator 44 are a complementary unijunction transistor relaxation oscillator for generating a train of variable repetition rate gating pulses that are amplified by a pulse amplifier. The timing circuit connected between low voltage terminals 54 and 31 includes a timing capacitor 55 connected in series with the collector-emitter path of an n-p-n control transistor 56, an emitter resistor 57, and a potentiometer 58. The base terminals of complementary unijunction transistor (CUJT) 59 are respectively connected in series with base resistors 60 and 61 between the low voltage terminals, and the emitter of CUJT 59 is connected directly to the negative terminal of timing capacitor 55. The complementary unijunction transistor is similar to the ordinary unijunction transistor but operates in the third quadrant rather than in the first quadrant, and has excellent frequency stability in an oscillator. Control transistor 56 functions essentially as a current source in the charging circuit for timing capacitor 55 by virtue of the fact that the collector current is a function of the base voltage. The d-c voltage level on a control capacitor 62 connected between the base of transistor 56 and terminal 31 thus determines the rate of charging of timing capacitor 55 and hence the pulse generator repetition rate. Potentiometer 58 varies the resistance in the charging circuit and can be used either as a factory adjustment or can be connected for adjustment by control knob 21' (FIG. 2) to provide a user control for the output power over a limited range. In operation, timing capacitor 55 repetitively charges negatively through transistor 56, resistor 57, and potentiometer 58, and CUJT 59 breaks over and conduts in each charging cycle when the emitter peak point voltage is reached. Capacitor 55 then discharges through base resistor 60 and the emitter-base junction of p-n-p transistor 63 and generates a gating pulse. The repetition rate of pulse generation, assuming that potentiometer 58 is set to a fixed position, depends on the voltage level on control capacitor 62, which is a relatively large capacitor (for example, 1 microfarad) so that the repetition rate ramps from one value to another as the utensil is placed on or removed from the energized coil.

The gating pulse amplifier comprises a transistor amplifier 63 connected in series with voltage divider resistors 64 and 65 between terminals 54 and 31, with the base of transistor 63 being coupled directly to the base 1 of CUJT 59. The junction of resistors 64 and 65 is connected to a transistor amplifier in the Darlington configuration provided by transistors 66 and 67. The collectors of both of these transistors are coupled directly to positive low voltage terminal 54, while the emitter of transistor 66 is connected through an emitter resistor 68 to negative terminal 31 and the emitter of transistor 67 is coupled to the gate of power thyristor 33. The gating pulse generated by CUJT 59 is inverted and amplified by transistor 63, and is further amplified by Darlington transistors 66 and 67. Emitter resistor 68 assures a rapid turn-off of the Darlington configuration comprising transistors 66 and 67 when the pulse is completed. The pulse amplifier circuit must apply a sufficiently large gating pulse to properly turn on the power thyristor, and in the case of a GE C139N silicon controlled rectifier, the gating pulse is 1 ampere with a rise time of 0.1 microsecond or faster which lasts for at least 2 microseconds to ensure uniform turn-on of the device. The use of high frequency filter capacitor 52, it will be recalled, provides a low source impedance to supply the required gating pulse.

As was mentioned, thyristor anode voltage sensor 41 is connected directly between point A on the inverter power circuit, or some other appropriate point, and negative d-c terminal 31. Although other suitable types of voltage responsive on-off sensors can be utilized, the preferred sensor for this application is comprised by a resistive voltage divider including series connected resistors 70 and 71 and an associated signal level transistor 72. Resistor 70 is a relatively high resistance resistor, while resistor 71 ordinarily has a resistance several magnitudes smaller. The base of transistor 72 is connected to the junction of voltage divider resistors 70 and 71 and its emitter is connected to negative terminal 31. Transistor 72 operates in the switching mode, and is conductive when the thyristor anode voltage at point A is high with respect to terminal 31 and is nonconductive when thyristor 33 or diode 34 are conducting so that the potentials at point A and at negative d-c terminal 31 are approximately the same. Thus, the collector voltage of transistor 72 is low during the nonconducting intervals of power devices 33 and 34, and high during the conducting intervals. To invert the polarity of this train of variable width square wave voltage pulses, the collector of transistor 72 is connected to the junction of a pair of series resistors 73 and 74 connected between low voltage terminals 54 and 31, this junction further being connected to the base of a second transistor 75. It is seen that transistor 75 conducts when transistor 72 is nonconducting, and vice versa. Accordingly, the collector voltage of transistor 75 is low during the conducting intervals of power devices 33, 34 and high during the nonconducting intervals of power devices 33, 34.

The train of square wave voltage pulses, each with a width depending upon the loading of the inverter power circuit, is converted to an average d-c voltage level by the averaging filter circuit 43. This function is provided by a resistor 76 connected between the collector of transistor 75 and the positive plate of control capacitor 62, and by the RC charging circuit connected between terminals 54 and 31 comprised by a resistor 77, a diode 78, and control capacitor 62. The voltage level on control capacitor 62, it is repeated, determines the repetition rate of the gating pulses. When transistor 75 is in the off state, control capacitor 62 charges through resistor 77 and diode 78 to a voltage approaching that of positive low voltage terminal 54. The periodic turn-on of transistor 75, however, tends to discharge capacitor 62 through resistor 76. The value of the components is such that the rate of discharge is close to the charging rate. Furthermore, the collector of transistor 75 is connected to the junction between charging resistor 77 and diode 78, and shunts the charging current. Accordingly, the voltage on control capacitor 62 goes lower with increasing intervals of conduction of transistor 75 and goes higher as the conducting intervals become shorter.

To provide a maximum frequency control, a Zener diode 79 is connected directly in parallel with control capacitor 62. As the voltage on control capacitor 62 increases, thereby increasing the gating pulse repetition rate, a voltage is reached at which Zener diode 79 begins to conduct so that the voltage on control capacitor 62 is effectively clamped. The minimum frequency control includes a resistor 80 and a pair of diodes 81 and 82 connected between low voltage terminals 54 and 31, and a third diode 83 connected between the positive plate of control capacitor 62 and the junction of resistor 80 and the first diode 81. Diodes 81 and 82 always conduct, thus establishing the potential at the anode of diode 83 at two diode drops or approximately 1.5 volts. Diode 83 is therefore forward biased whenever the voltage on control capacitor 62 is below this value, such as during start-up of the circuit, and prevents the voltage on control capacitor 62 from going below this minimum level. The minimum gating pulse repetition rate, as previously mentioned, is about 18 kHz for noiseless operation.

Additional circuitry controls the cooking appliance during start-up and shut-down as the user actuates the on-off control knob 21 (FIG. 2). Upon applying power to the unit, the generation of gating pulses is inhibited for a short starting interval to allow the d-c input voltage $E_{dc}$ to build up to its full value and to permit commutating capacitor 32 to charge so as to have sufficient energy to effect proper commutation. The start-up and shut-down circuit includes a voltage dropping resistor 85 connected in series with a capacitor 96 and a diode 87 between the power circuit d-c input terminals 30 and 31. The base-emitter of a transistor 88 shunts the blocking diode 87 to thereby permit current flow in both directions, and the collector of transistor 88 is connected to the junction bwtween the voltage divider resistors 70 and 71 in the thyristor anode voltage sensor. Further, a clamping transistor 89 is connected directly across the terminals of timing capacitor 55 in voltage controlled oscillator and pulse generator 44, the base of clamping transistor 89 being connected through a resistor 90 to the positive terminal of capacitor 86. To provide a rapid discharge path for capacitor 86 during circuit shut-down, a diode 91 connected to its positive terminal and to low voltage supply terminal 54 acts in connection with the previously mentioned blocking diode 87. The operation of the start-up and shut-down circuit will be explained in conjunction with a brief review of the operation of the entire constant duty cycle control circuit 40.

It is assumed in the following description that the power level control knob 21' adjuting potentiometer 58 has been set to the desired position and that the TV dinner 17' has not yet been placed in cooking position on the warming appliance when the unit is turned on. Upon applying power, capacitor 86 begins to charge through resistor 85 and the base-emitter junction of transistor 88. Since transistor 88 is conducting, the base of transistor 72 in thyristor anode voltage sensor 41 is clamped to negative terminal 31 to thereby inhibit operation of the sensor during the starting interval. Clamping transistor 89 also conducts and inhibits the complementary unijunction transistor oscillator since timing capacitor 55 cannot charge. When capacitor 86 becomes nearly fully charged, the potential at its positive terminal biases clamping transistor 89 to the nonconducting state, and transistor 88 turns off, thereby releasing voltage controlled oscillator and pulse generator 44 and thyristor anode sensor 41 for operation. In the meantime, control capacitor 62 has charge rapidly through resistor 80 and diode 83 in the minimum frequency control circuit to reach the minimum frequency control voltage. constant duty cycle control circuit 40 now begins to generate gating pulses at a repetition rate at approximately the minimum frequency of 18 kHz. In the voltage controlled oscillator, CUJT 59 breaks over and conducts repetitively as the voltage on timing capacitor 55 reaches the emitter peak point voltage. The gating pulse is amplifier by transistor 63, and also by the Darlington transistor amplifier 66, 67 before being applied to the gate electrode of power thyristor 33. With the inverter in the unloaded condition, the losses in the high frequency oscillatory circuit are low, with the result that the period $t_r$ is relatively long as shown in FIG. 6a. Assuming steady state operation, thyristor anode voltage sensor 41 operates to produce at the collector of transistor 72 a train of variable width square wave voltage pulses whose polarity is inverted by transistor 75. Whereas transistor 72 is turned on during the nonconducting intervals of power thyristor 33 and power diode 34, transistor 75 is turned on during their conducting intervals. Averaging filter circuit 43 converts the square or quasi-square wave output voltage of thyristor anode voltage sensor 41 to a d-c voltage level indicative of the intervals of conduction and nonconduction of the solid state power devices in the inverter power circuit. This corresponds to the periods of oscillation and non-oscillation of the power circuit. The circuit components are selected such that with the coil unloaded, control capacitor 62 has the proper voltage so that the gating frequency of the inverter is of the correct value to produce the desired duty cycle. A duty cycle near 50 percent is a practical value.

Utilizing a closed feedback loop control technique, control circuit 40 maintains an approximately constant duty cycle $t_r/T$ when the TV dinner 17' is placed in cooking position on the warming appliance. In the loaded condition of the inverter, as opposed to the unloaded condition, the losses in the high frequency oscillation circuit are higher and the period $t_r$ is shorter. Thyristor anode voltage sensor 41 senses the shorter intervals of conductor and nonconduction of power thyristor 33 and power diode 34, with the effective result that transistor 75 conducts periodically for shorter intervals so that control capacitor 62 charges to a higher voltage. Consequently, the repetition rate of the gating pulses generated by voltage controlled oscillator and pulse generator 44 is higher. Since the operating frequency of the inverter power circuit is increased, and the period T is now shorter, the duty cycle $t_r/T$ is approximately the same as in the unloaded case. Since the loop gain of the control loop is relatively high, the loaded and unloaded duty cycles need only be different by a small amount to afford the necessary change in voltage on control capacitor 62 which is necessary to achieve the desired frequency variations. That is, it takes only a small change in voltage on control capacitor 62 to vary the gating frequency over a wide range. Therefore, for all practical purposes the duty cycle remains the same in the loaded and unloaded case. The act of placing the utensil on the inductor warming appliance is relatively long compared to the periods of the ultrasonic operating frequencies, and hence the operating frequency ramps from one value to the other. Upon turning off the unit, as was previously explained, capacitor 86 discharges rapidly through diodes 91 and 87. Diode 91 provides for a fast discharge path hrough resistor 50 and the collapsing d-c power supply. Thus, capacitor 86 is charged slowly at turnon through resistor 85 and is rapidly discharged at turn-off through resistor 50 which is a much smaller resistance than resistor 85. In this manner the circuit can be restarted again without having to wait for a considerable discharge time.

An advantage of the inverter control circuit constructed according to the teaching of the invention is that the detection of the presence and absence of a utensil load by sensing a power circuit voltage or other appropriate power circuit parameter is in keeping with the principle of a smooth-top appliance. The placing of holes in utensil support 16 or the use of a sensor that projects above the utensil support is not required. The on-off sensor, furthermore, does not conduct power currents. Although this may increase the complexity of the control circuit, the trade off is made of keeping the power circuit as simple as possible to help achieve the low costs often needed in consumer-oriented appliances. As compared to a threshold type sensor, the on-off sensor allows lower peak voltage and current stresses.

In summary, a constant duty cycle control circuit as herein described automatically adjusts the operating frequency of the inverter power circuit according to the load conditions. To compensate for the increased period of oscillation when the inverter changes from the loaded to the unloaded condition, the operating frequency is decreased to achieve more optimum performance. In the case of induction cooking appliances, lower current rated and voltage rated power semiconductors and other circuit components can be used since the decreased operating frequency with the utensil removed from the coil reduces the electrical stresses and losses. Conversely, the operating frequency increases when loaded to supply more power to the load. The novel on-off sensor is operative continuously to supply data as to the load condition of the inverter power circuit. The inverter with constant duty cycle control can be used for other induction heating applications, and for appropriate applications not related to induction heating.

While the invention has been particularly shown and described with reference to a preferred embodiment thereof, it will be understood by those skilled in the art that various changes in form and details may be made therein without departing from the spirit and scope of the invention.

What I claim as new and desire to secure by Letters Patent of the United States is:

1. A solid state cooling appliance for inductively heating a utensil load comprising
   an induction heating coil mounted adjacent a substantially unbroken utensil support and producing an alternating magnetic field,
   a static power conversion circuit including a variable operating frequency power circuit controlled by solid state power device means for driving said induction heating coil, and
   a constant duty cycle control circuit operating at signal level and connected to selected points on said power circuit, said constant duty cycle control circuit supplying turn-on signals to said solid state power device means to continuously vary said operating frequency as a function of the load condition of said induction heating coil, in which
   said constant duty cycle control circuit is controlled by a sensor connected between a pair of said points on said power circuit to sense a power circuit parameter indicative of the intervals of conduction and nonconduction of said solid state power device means.

2. A cooking appliance according to claim 1 in which said sensor is an on-off sensor for sensing the voltage at one terminal of said solid state power device means.

3. A cooking appliance according to claim 2 in which said on-off sensor comprises a voltage divider circuit and a solid state switch coupled to a junction of said voltage divider circuit for generating a train of variable width voltage pulses.

4. A solid state cooking appliance for inductively heating a utensil load comprising
   an induction heating coil mounted adjacent a substantially unbroken utensil support and producing an alternating magnetic field,
   a static power conversion circuit including a variable operating frequency power circuit controlled by solid state power device means for driving said induction heating coil, and
   a constant duty cycle control circuit operating at signal level and connecting to selected points on said power circuit, said constant duty cycle control circuit supplying turn-on signals to said solid state power device means to continuously vary said operating frequency as a function of the load condition of said induction heating coil, in which
   said constant duty cycle control circuit comprises an on-off sensor connected between a pair of said points on said power circuit for generating a train of variable width pulses indicative of the intervals of conduction and nonconduction of said solid state power device means, an averaging filter circuit for converting said train of pulses to a variable direct voltage signal, and a voltage controlled oscillator and pulse generator for producing said turn-on signals at a variable repetition rate dependent on the magnitude of said direct voltage signal.

5. A cooking appliance according to claim 4 in which said constant duty cycle control circuit further includes a minimum and maximum frequency control circuit for limiting the magnitude of said direct voltage signal to a predetermined range.

6. A solid state cooking appliance for inductively heating a utensil load comprising
   an induction heating coil mounted adjacent a substantially unbroken utensil support and producing an alternating magnetic field,
   a static power conversion circuit including a variable operating frequency power circuit controlled by solid state power device means for driving said induction heating coil, and
   a constant duty cycle control circuit operating at signal level and connected to selected points on said power circuit, said constant duty cycle control circuit supplying turn-on signals to said solid state power device means to continuously vary said operating frequency as a function of the load condition of said induction heating coil, in which
   said variable operating frequency power circuit is an oscillatory power circuit, and
   said constant duty cycle control circuit comprises an on-off sensor connected between a pair of said points on said power circuit for generating a train of variable width pulses indicative of the intervals of oscillation and nonoscillation of said power circuit, an averaging filter circuit for converting said train of pulses to a variable direct voltage signal, and a voltage controlled oscillator and pulse generator for producing said turn-on signals at a variable repetition rate dependent on the magnitude of said direct voltage signal.

7. A cooking appliance according to claim 6 in which said constant duty cycle control circuit further includes a minimum and maximum frequency control circuit for limiting the magnitude of said direct voltage signal to a predetermined range.

8. A cooking appliance according to claim 7 in which said constant duty cycle control circuit further includes a start-up circuit operatively coupled to inhibit said on-off sensor and voltage control oscillator during a starting interval.

9. A solid state cooking appliance for inductively heating a utensil load comprising
   an induction heating coil mounted adjacent a substantially unbroken non-metallic utensil support for producing an alternating magnetic field,
   a variable operating frequency inverter power circuit controlled by solid state power device means for converting an input unidirectional voltage to an ultrasonic frequency wave that drives said induction heating coil, and
   a signal level constant duty cycle control circuit controlled by an on-off sensor connected between selected points on said inverter power circuit to sense a predetermined power circuit parameter,
   said constant duty cycle control circuit supplying gating signals to said solid state power device means to continuously vary said operating frequency in accordance with the presence and absence of a utensil coupled with said induction heating coil, in which
   said on-off sensor is connected to sense the intervals of conduction and nonconduction of said solid state power device means,
   said constant duty cycle control circuit operating to increase said operating frequency with the sensing of shorter conduction intervals due to the coupling of power to the utensil, and to decrease said operating frequency with the sensing of longer conduction intervals due to the absense of the utensil.

10. A solid state cooking appliance for inductively heating a utensil load comprising
    an induction heating coil mounted adjacent a substantially unbroken non-metallic utensil support for producing an alternating magnetic field,
    a variable operating frequency inverter power circuit controlled by solid state power device means for converting an input unidirectional voltage to an ultrasonic frequency wave that drives said induction heating coil, and
    a signal level constant duty cycle control circuit controlled by an on-off sensor connected between selected points on said inverter power circuit to sense a predetermined power circuit parameter,
    said constant duty cycle control circuit supplying gating signals to said solid state power device means to continuously vary said operating frequency in accordance with the presence and absence of a utensil coupled with said induction heating coil, in which
    said inverter power circuit is a series resonant circuit and said solid state power device means comprises the inverse-parallel combination of a thyristor and a diode, and
    said on-off sensor connected between selected points on said inverter power circuit is a voltage responsive sensor connected to one terminal of said thyristor for sensing the intervals of conduction and non-conduction of said thyristor-diode combination.

11. A cooking appliance according to claim 10 in which said on-off sensor is comprised by a resistance voltage divider circuit and a solid state switch coupled to a junction of said voltage divider to produce a train of variable width voltage pulses.

12. A cooking appliance according to claim 11 in which said constant duty cycle control circuit further includes an averaging filter circuit for converting said train of pulses to a variable direct voltage signal, and a voltage controlled oscillator and pulse generator for producing said gating signals at a variable repetition rate depending on the magnitude of said direct voltage signal.

* * * * *